(12) United States Patent
Burton et al.

(10) Patent No.: US 7,120,824 B2
(45) Date of Patent: Oct. 10, 2006

(54) METHOD, APPARATUS AND PROGRAM STORAGE DEVICE FOR MAINTAINING DATA CONSISTENCY AND CACHE COHERENCY DURING COMMUNICATIONS FAILURES BETWEEN NODES IN A REMOTE MIRROR PAIR

(75) Inventors: David Alan Burton, Vail, AZ (US); Noel Simen Otterness, Lafayette, CO (US); Alan Lee Stewart, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 10/435,350

(22) Filed: May 9, 2003

(65) Prior Publication Data

US 2004/0236983 A1 Nov. 25, 2004

(51) Int. Cl.
*G06F 11/00* (2006.01)
(52) U.S. Cl. .............................. 714/6; 714/11; 714/12; 714/13; 707/10; 707/201
(58) Field of Classification Search .................... 714/6, 714/11–13; 707/10, 201
See application file for complete search history.

(56) References Cited

U.S. PATENT DOCUMENTS

| | | | |
|---|---|---|---|
| 5,537,533 A | 7/1996 | Staheli et al. | |
| 5,742,792 A | * 4/1998 | Yanai et al. | 711/162 |
| 5,889,935 A | 3/1999 | Ofek et al. | |
| 6,157,991 A | 12/2000 | Arnon | |
| 6,158,019 A | 12/2000 | Squibb | |
| 6,173,337 B1 | 1/2001 | Akhond et al. | |
| 6,199,074 B1 | 3/2001 | Kern et al. | |
| 6,308,284 B1 | 10/2001 | LeCrone et al. | |

* cited by examiner

*Primary Examiner*—Robert Beausoliel
*Assistant Examiner*—Charles Ehne
(74) *Attorney, Agent, or Firm*—David W. Lynch; Chambliss, Bahner & Stophel P.C.

(57) ABSTRACT

A method, apparatus and program storage device for maintaining data consistency and cache coherency during communications failures between nodes in a remote mirror pair. A link between a mirror pair of storage systems is monitored. During a link failure between a first storage system and a second storage systems, reads and writes on the first and second storage systems are independently performed and write data and associated timestamps are maintained for the write data for each write in a queue on the first and second storage system. After link reestablishment, volume sets on the first and second storage systems are resynchronized using write data and associated timestamps.

21 Claims, 6 Drawing Sheets

METHOD, APPARATUS AND PROGRAM STORAGE DEVICE FOR MAINTAINING DATA CONSISTENCY AND CACHE COHERENCY DURING COMMUNICATIONS FAILURES BETWEEN NODES IN A REMOTE MIRROR PAIR

BACKGROUND OF THE INVENTION

1. Field of the Invention

This invention relates in general to data storage systems that use redundant data backup, and more particularly to a method, apparatus and program storage device for maintaining data consistency and cache coherency during communications failures between nodes in a remote mirror pair.

2. Description of Related Art

Due to advances in computer technology, there has been an ever-increasing need for data storage in data processing networks. In a typical data processing network, there has been an increase in the number of volumes of data storage and an increase in the number of hosts needing access to the volumes.

Fortunately for computer users, the cost of data storage has continued to decrease at a rate approximating the increase in need for storage. For example, economical and reliable data storage in a data network can be provided by a storage subsystem. However, as people's reliance upon machine readable data increases, they are more vulnerable to damage caused by data loss. Large institutional users of data processing systems which maintain large volumes of data such as banks, insurance companies, and stock market traders must and do take tremendous steps to insure back up data availability in case of a major disaster. These institutions recently have developed a heightened awareness of the importance of data recovery and back-up in view of world events. Consequently, data backup systems have never been more important.

Generally, data backup systems copy a designated group of source data, such as a file, volume, storage device, partition, etc. If the source data is lost, applications can use the backup copy instead of the original, source data. The similarity between the backup copy and the source data may vary, depending upon how often the backup copy is updated to match the source data.

Currently, data processing system users often maintain copies of their valuable data on site on either removable storage media, or in a secondary "mirrored" storage device located on or within the same physical confines of the main storage device. If the backup copy is updated in step with the source data, the copy is said to be a "mirror" of the source data, and is always "consistent" with the source data. Should a disaster such as fire, flood, or inaccessibility to a building occur, however, both the primary as well as the secondary or backed up data will be unavailable to the user. Accordingly, more data processing system users are requiring the remote storage of back up data.

Some competing concerns in data backup systems are cost, speed, and data consistency. Systems that guarantee data consistency often cost more, and operate more slowly. On the other hand, many faster backup systems typically cost less while sacrificing absolute consistency. One conventional technique for recovering backup data involves the maintenance of data in "duplex pairs." In a duplex pair configuration, each time data is written on a disk or some other storage media, a duplicate copy is written on a backup disk as well.

One example of a data backup system is the Extended Remote Copy ("XRC") system, sold by International Business Machines Corp ("IBM"). In addition to the usual primary and secondary storage devices, the XRC system uses a "data mover" machine coupled between primary and secondary devices. The data mover performs backup operations by copying data from the primary devices to the secondary devices. Storage operations in the XRC system are "asynchronous," since primary storage operations are committed to primary storage without regard for whether the corresponding data has been stored in secondary storage.

The secondary devices are guaranteed to be consistent with the state of the primary devices at some specific time in the past. This is because the XRC system time stamps data updates stored in the primary devices, enabling the secondary devices to implement the updates in the same order. Time stamping in the XRC system is done with a timer that is shared among all hosts coupled to primary storage. Since the secondary devices are always consistent with a past state of the primary devices, a limited amount of data is lost if the primary devices fail.

A different data backup system is IBM's Peer-to-Peer Remote Copy ("PPRC") system. The PPRC approach does not use a data mover machine. Instead, storage controllers of primary storage devices are coupled to controllers of counterpart secondary devices by suitable communications links, such as fiber optic cables. The primary storage devices send updates to their corresponding secondary controllers. With PPRC, a data storage operation does not succeed until updates to both primary and secondary devices complete. In contrast to the asynchronous XRC system, PPRC performs "synchronous" backups.

In many backup systems, recovery involves a common sequence of operations. First, backup data is used to restore user data to a known state, as of a known date and time. Next, "updates" to the primary storage subsystem that have not been transferred to the secondary storage subsystem are copied from the "log" where they are stored at the primary storage subsystem, and applied to the restored data. The logged updates represent data received after the last backup was made to the secondary storage subsystem, and are usually stored in the same chronological order according to when they were received by the primary storage subsystem. After applying the logged updates, the data is considered to be restored, and the user's application program is permitted to access the restored data.

Although many of the foregoing technologies constitute significant advances, and may even enjoy significant commercial success today, engineers are continually seeking to improve the performance and efficiency of today's data backup systems. One area of possible focus concerns remote mirroring. Remote mirroring provides a large amount of additional data protection above and beyond what is available in a standard RAID configuration. This includes remote copies of a users data that can be used at a later point to recover from certain types of failures, including complete loss of a controller pair.

In a remote mirror system, the ability to read and write data from either side of the mirror pair is necessary. By allowing reads and writes from either side simultaneously, the ever-present problem of data integrity becomes an issue. In a distributed memory system of a remote mirror system there are two cases that need to be solved to insure that only the most recent data is presented to the host: the first is the double write problem and the second is the read after write problem.

The double write problem occurs when both sides of the mirror pair write data to the same location at the same time (or very close to the same time). The problem is determining which data is actually the latest. This problem may be solved by overwriting the write that gets processed first with the second write thereby creating a race condition without either of the writes really being the correct one to retain. This problem is best solved at the host level.

The second case is the read after write problem. A distributed memory architecture of a remote mirror system leads to the read after write problem because of latencies between when a write occurs in one memory and when the write is reflected into the other, remote, memory. This problem is compounded in the event of a communications failure between the remote pair. Further, with remote mirroring, the link may disappear and reappear at anytime without either of the controller pairs having actually failed. Nevertheless, during a link outage, both controller pairs continue to operate normally. Thus, the problem becomes one of recovery of the locking information and insuring that the correct data ends up on the two mirror volume sets when the link is recovered. Because both controller pairs may be operating properly, all data may not reside on the same volume set. Thus, the data that exists on two separate physical entities (two physically separate disk sets) must be synchronized.

It can also be seen that there is a need for a method, apparatus and program storage device for maintaining data consistency and cache coherency during communications failures between nodes in a remote mirror pair.

SUMMARY OF THE INVENTION

To overcome the limitations in the prior art described above, and to overcome other limitations that will become apparent upon reading and understanding the present specification, the present invention discloses a method, apparatus and program storage device for maintaining data consistency and cache coherency during communications failures between nodes in a remote mirror pair.

The present invention solves the above-described problems by maintaining a timestamp for all writes occurring while the link between the mirror pair is down and then resynchronizing the data on the mirror pair based upon the write data and the timestamp information.

A method in accordance with the principles of the present invention includes monitoring a link between a mirror pair of storage systems, the mirror pair comprising a first storage system and a second storage system, during a link failure between the first storage system and the second storage systems, independently performing reads and writes on the first and second storage systems and maintaining write data and associated timestamps for the write data for each write in a queue of the first and second storage system and after link reestablishment, resynchronizing volume sets on the first and second storage systems using the write data and associated timestamps.

In another embodiment of the present invention a program storage device readable by a computer embodies one or more programs of instructions executable by the computer to perform a method for maintaining data consistency and cache coherency during communications failures between nodes in a remote mirror pair. The method includes monitoring a link between a mirror pair of storage systems, the mirror pair comprising a first storage system and a second storage system, during a link failure between the first storage system and the second storage systems, independently performing reads and writes on the first and second storage systems and maintaining write data and associated timestamps for the write data for each write in a queue of the first and second storage system and after link reestablishment, resynchronizing volume sets on the first and second storage systems using the write data and associated timestamps.

In another embodiment of the present invention a data storage system is provided. The data storage system includes a first storage subsystem, the first storage subsystem comprising an array of drives, a second storage subsystem comprising an array of drives and having a mirrored volume set thereon of the volume set on the first storage subsystem, a first and second controller coupled respectively to the first and second storage subsystems and a host, coupled to the first and second controllers, for issuing input/output requests to the first data storage system, wherein the first and second controller are coupled by a link, the first and second controller further being configured to monitor the link coupling the first storage system and the second storage system, during a link failure between the first storage system and the second storage systems, to independently perform reads and writes on the first and second storage systems and maintain write data and associated timestamps for the write data for each write in a queue of the first and second storage system and after link reestablishment, and to resynchronize volume sets on the first and second storage systems using the write data and associated timestamps.

In another embodiment of the present invention a data processing apparatus is provided. The data processing apparatus includes a memory comprising executable instructions for performing a method allowing and a processor for executing instruction provided from the memory, wherein the processor is configured by the executable instructions from the memory to monitor a link to a second storage system, during a link failure, to independently perform reads and writes and maintain write data and associated timestamps for the write data for each write in a queue and, after link reestablishment, to resynchronize volume sets with the second storage system using the write data and associated timestamps.

In another embodiment of the present invention another program storage device readable by a computer embodies one or more programs of instructions executable by the computer to perform a method for maintaining data consistency and cache coherency during communications failures between nodes in a remote mirror pair. This method includes monitoring a link to a second storage system, during a link failure, independently performing reads and writes and maintaining write data and associated timestamps for the write data for each write in a queue and after link reestablishment, resynchronizing volume sets with the second storage system using the write data and associated timestamps.

In another embodiment of the present invention a data storage system is provided. The data storage system includes a first storage means for storing a volume set thereon, a second storage means for providing a mirrored volume set thereon of the volume set on the first storage subsystem, means, coupled to the first and second storage means, for controlling the first and second storage means and host means, coupled to the means for controlling, for issuing input/output requests to the first data storage system, wherein the means for controlling include linking means, the means for controlling further monitoring the linking means and, during a link failure between the first storage means and the second storage means, independently performing reads and writes on the first and second storage means and maintaining write data and associated timestamps for the write data for each write in a queue of the first and second storage means and after link reestablishment, and resynchronizing volume sets on the first and second storage means using the write data and associated timestamps.

In another embodiment of the present invention a data processing apparatus is provided. The data processing apparatus includes means for providing memory that includes executable instructions and processing means for executing instruction provided from the means for providing memory, wherein the processing means is configured to perform the executable instructions from the means for providing memory for monitoring a link to a second storage means, during a link failure, independently performing reads and writes and maintaining write data and associated timestamps for the write data for each write and, after link reestablishment, resynchronizing volume sets with the second storage means using the write data and associated timestamps.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method, apparatus and program storage device for maintaining data consistency and cache coherency during communications failures between nodes in a remote mirror pair. The present invention maintains a timestamp for all writes occurring while the link between the mirror pair is down and then resynchronizes the data on the mirror pair based upon the write data and the timestamp information.

Figure 1:
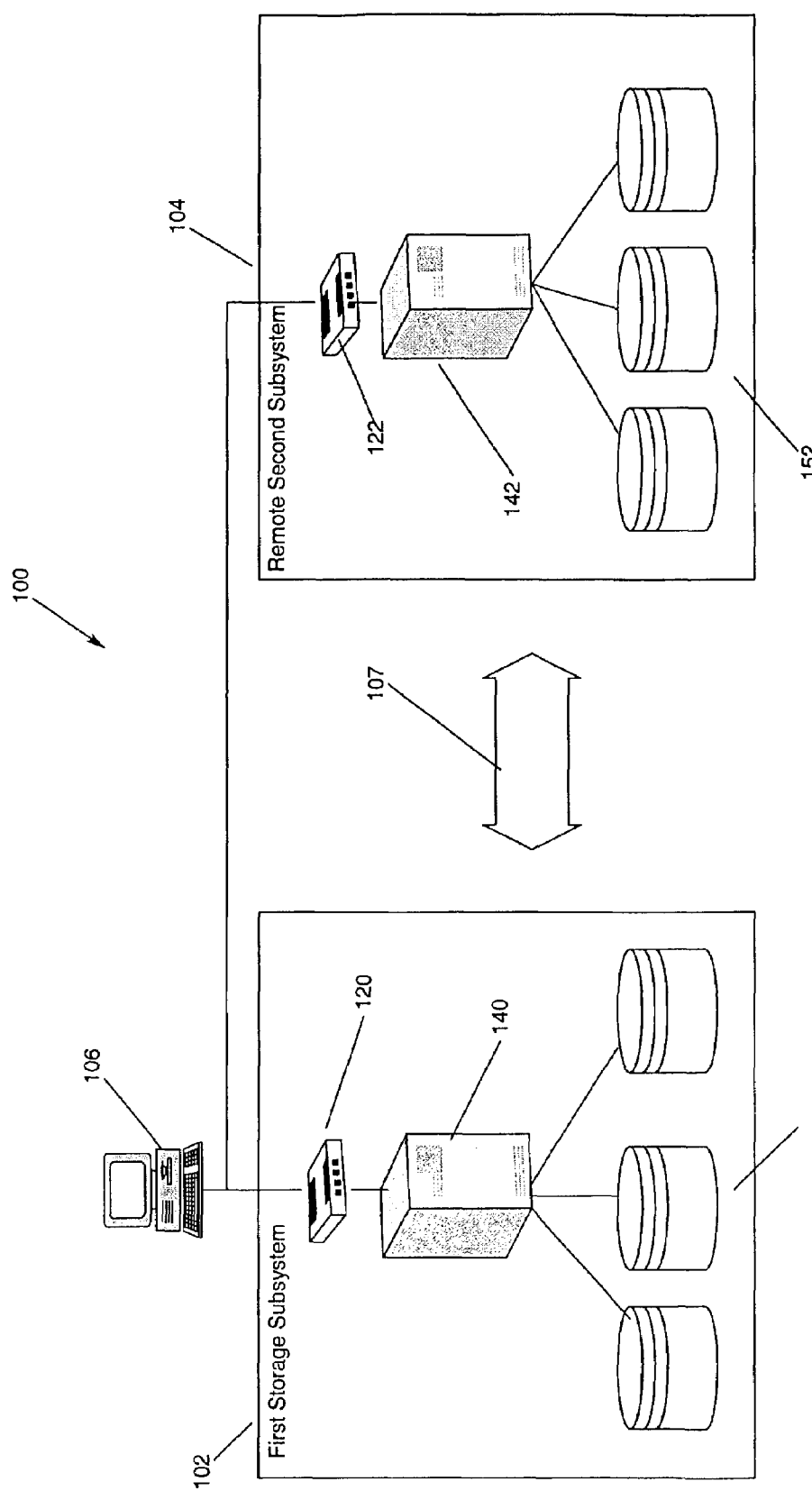
FIG. 1 illustrates one example of a data storage system according to the present invention.

FIG. 1 illustrates one example of a data storage system 100 according to the present invention. The system 100 includes a first storage subsystem 102 and a remote second storage subsystem 104. The first storage subsystem 102 and remote second storage subsystem 104 are coupled to one or more hosts, as illustrated by the host 106, via a controllers 120, 122. For example, controllers 120, 122 may be RAID controllers (Redundant Arrays of Inexpensive (or Independent) Disks). A RAID controller provides increased capacity and reliability using multiple smaller storage modules configured in geometries that permit redundancy of stored data to assure data integrity in case of various failures. The RAID controller shields the user or host system from the details of managing the redundant array. Nevertheless, those skilled in the art will recognize that controllers 120, 122 are not limited to a RAID controller, but may be a data processing device configured in any manner according to the present invention. The storage subsystems 102, 104 are coupled by a link 107 for use in copying updates from the first storage subsystem 102 to the remote second storage subsystem 104.

As illustrated, the first storage subsystem 102 and remote second storage subsystem 104 are coupled to a host 106, which comprises one or more personal computers, mainframe computers, computer workstations, computer networks, manually operated data input devices, modem, scanner, or other source of data. Broadly, the host 106 sends data to storage subsystems 102, 104 for storage therein. For ease of reference, data is used to include data that is new to storage subsystems 102, 104 additions to existing data stored on the storage subsystems 102, 104 changes to existing data, deletions, etc. Ultimately, the data that has been committed to the first storage subsystem 102 is copied to counterpart storage devices in the remote second storage subsystem 104, and vice versa.

First storage subsystem 102 and remote second subsystem 104 may include a server 140, 142 as well as an array 150, 152. However, the present invention is not meant to be limited to any particular data storage configuration. The present invention also contemplates a number of other data storage arrangements, which should be apparent to those of ordinary skill in the art with the benefit of this disclosure. As an example, the storage system may include multiple primary storage subsystems and multiple remote secondary storage subsystems. In this arrangement, each primary storage subsystem may be coupled to one or more hosts, where these hosts may (or may not) be attached to other primary storage subsystems.

The primary storage subsystem's controller 120 may be implemented in different forms, including a microprocessor or other digital data processing apparatus. This apparatus may be embodied by various hardware components and interconnections. Further, the primary data storage subsystem 102 and remote second data storage subsystem 104 may include a digital data processing apparatus, such as controllers 120, 122 as described above. Those skilled in the art that the designation of first and remote second are used for clarification only and that a volume set on remote storage subsystem is in effect mirrored by the volume set on the first storage subsystem. Thus, the present invention, as will be described herein, could be operate in reverse fashion.

Figure 2:
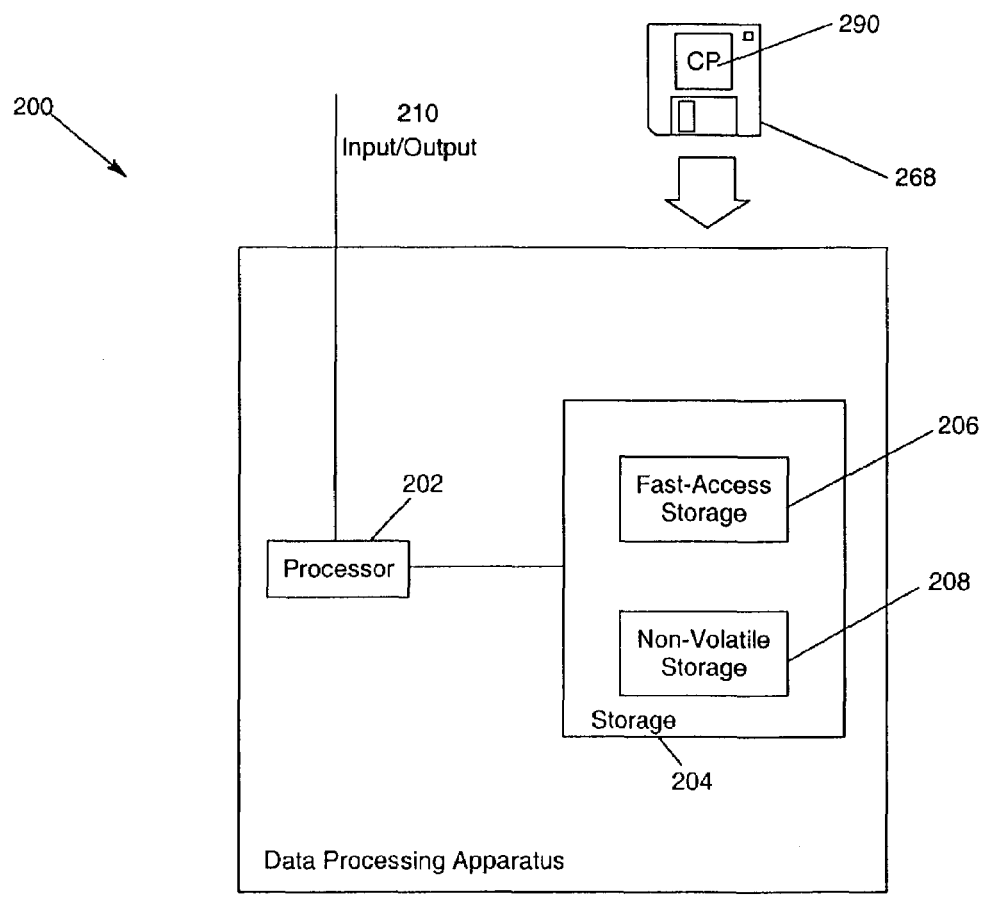
FIG. 2 illustrates a data processing apparatus according to the present invention.

FIG. 2 illustrates a data processing apparatus 200 according to the present invention. The apparatus 200 includes a processor 202, such as a microprocessor or other processing machine, coupled to a storage 204. The apparatus 200 also includes an input/output 210, such as a line, bus, cable, electromagnetic link, or other means for the processor 202 to exchange data with other hardware external to the apparatus 200, e.g., a host or storage array.

In the present example, the storage 204 includes a fast-access storage 206, as well as nonvolatile storage 208. The fast-access storage 206 may comprise random access memory ("RAM"), and may be used to store programming instructions executed by the processor 202. Moreover, fast-access storage 206 may also provide cache memory that is mapped to storage blocks on a disk array and as a queue for write data.

The data processing apparatus 200 may be, for example, a RAID controller. A RAID controller provides control for multiple smaller storage modules configured in geometries that permit redundancy of stored data to assure data integrity in case of various failures. A RAID controller shields the user or host system from the details of managing the redundant array. Mapping provided by the fast-access storage 206, e.g., cache memory, is transparent to the host system. The host system simply requests blocks of data to be read or written and the RAID controller manipulates the disk array and cache memory as required.

Nevertheless, the present is not limited to a RAID controller. Furthermore, despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

In contrast to the digital data storage apparatus 200 discussed above, a different embodiment of the invention may use logic circuitry instead of computer-executed instructions to implement the controller 120. Depending upon the particular requirements of the application in the areas of speed, expense, tooling costs, and the like, this logic may be implemented by constructing an application-specific integrated circuit ("ASIC"). Other alternatives include a digital signal processing chip ("DSP"), discrete circuitry (such as resistors, capacitors, diodes, inductors, and transistors), field programmable gate array ("FPGA"), programmable logic array ("PLA"), and the like.

Figure 3:
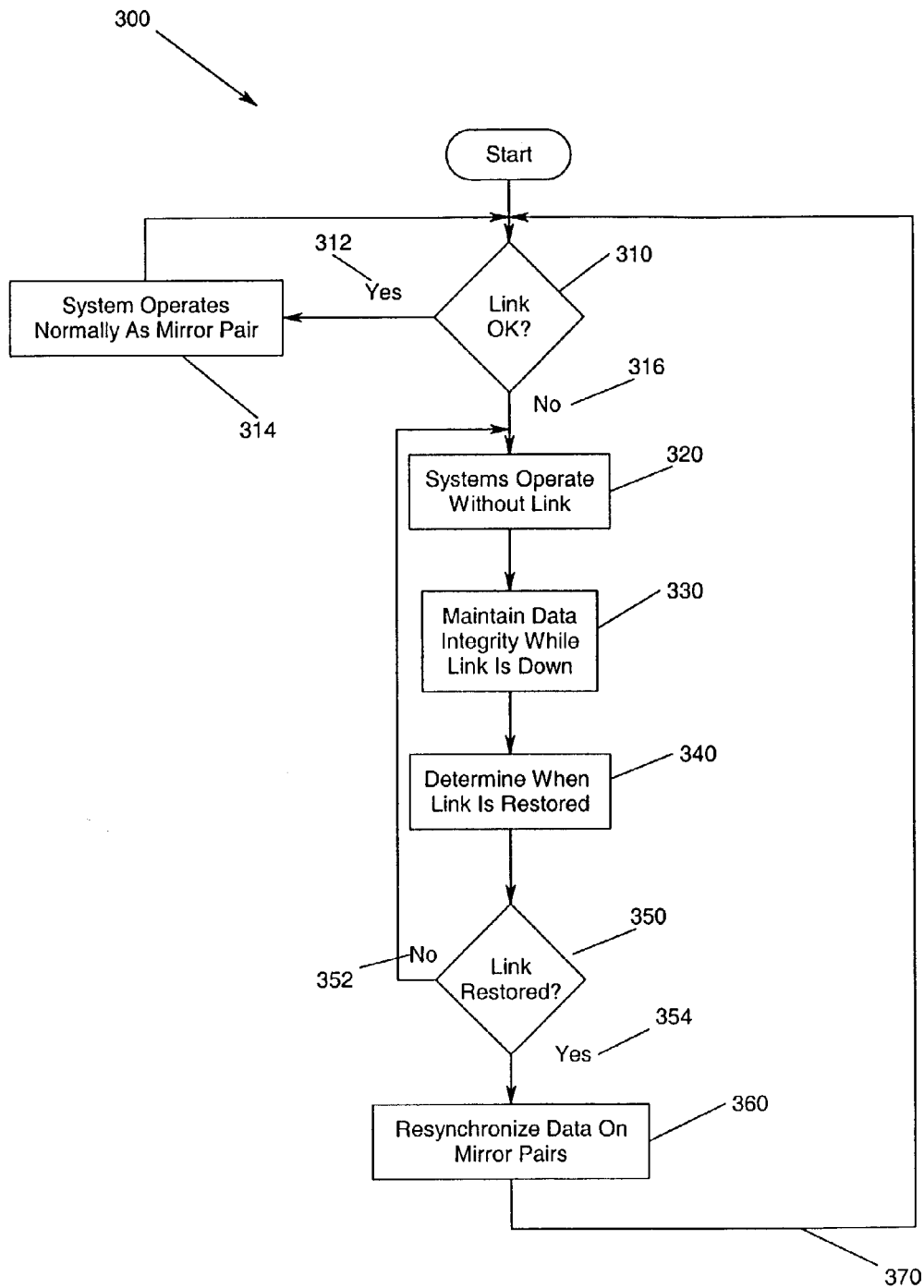
FIG. 3 is a flow chart of the method for maintaining data consistency and cache coherency during communications failures between nodes in a remote mirror pair according to the present invention.

FIG. 3 is a flow chart 300 of the method for maintaining data consistency and cache coherency during communications failures between nodes in a remote mirror pair according to the present invention. The system monitors the status of a communication link between the mirror pair 310. If the link is operable 312, the system operates in a normal mode 314. If the link is down 316, the system components continue to operate even while the communications link is down 320. This requires that after a certain number of attempts, the mirror pairs operate as though they are independent units.

Each side of the mirror pair maintains the information needed to reconstruct the operations which took place while the link was out 330. While the link is down, any requests to obtain a region of the volume set for write access is immediately granted. This is required since there is no way to receive a grant for write access from the mirror partner. The system does not fail the partner controller, i.e., the mirror partner.

The system continues 352 to monitor the status of the link 340 and determines when the link is restored 350. Once the link has been reestablished between the mirror pairs 354, the two sides of the mirror resynchronize their volume sets according to the latest data. After resynchronization, the system will continue the process 370 thereby ensuring that data consistency and cache coherency is maintained.

Figure 4:
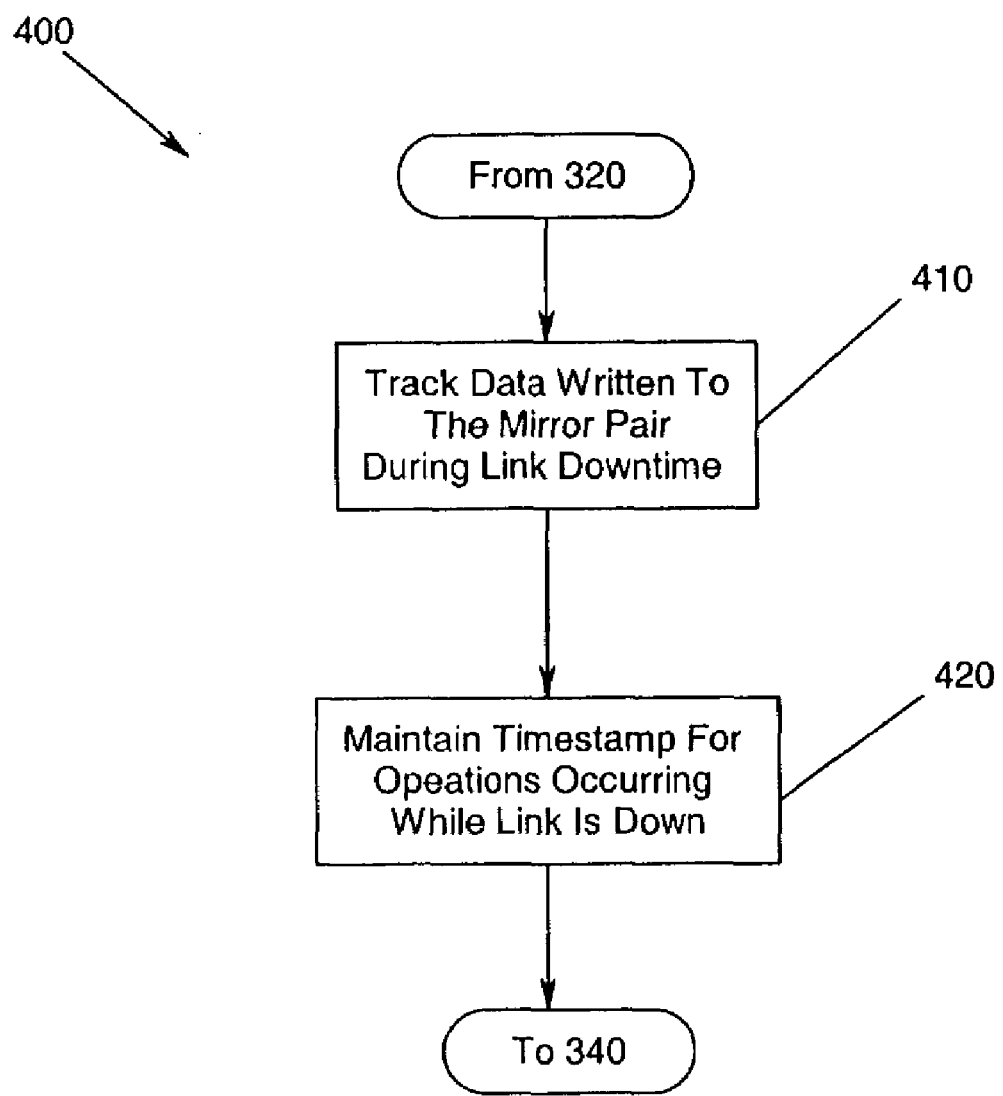
FIG. 4 is a flow chart showing the maintenance of data integrity according to the present invention.

FIG. 4 is a flow chart 400 showing the maintenance of data integrity according to the present invention. As mentioned above, the system components continue to operate even while the communications link is down 320. The system maintains the correct information while the link is out by keeping track of what data is written to the mirror pair 410. The system maintains timestamps for operations occurring while link is down 420. Because only the latest data is relevant, the process is straightforward. For example, if multiple writes are made to the same block of the volume set, only the latest write needs to be recorded and time stamped. The system will continue to monitor the status of the link 340. For example, a ping mechanism may be used for sending a request on the link and waiting to receive a reply to insure that the link is working and to determine when the communications link has been reestablished. Part of the purpose of the ping mechanism is to provide a continuously update clock between the two mirror sides. This is done to prevent clock drift from being too large a factor during the resynchronize operations.

Figure 5A:
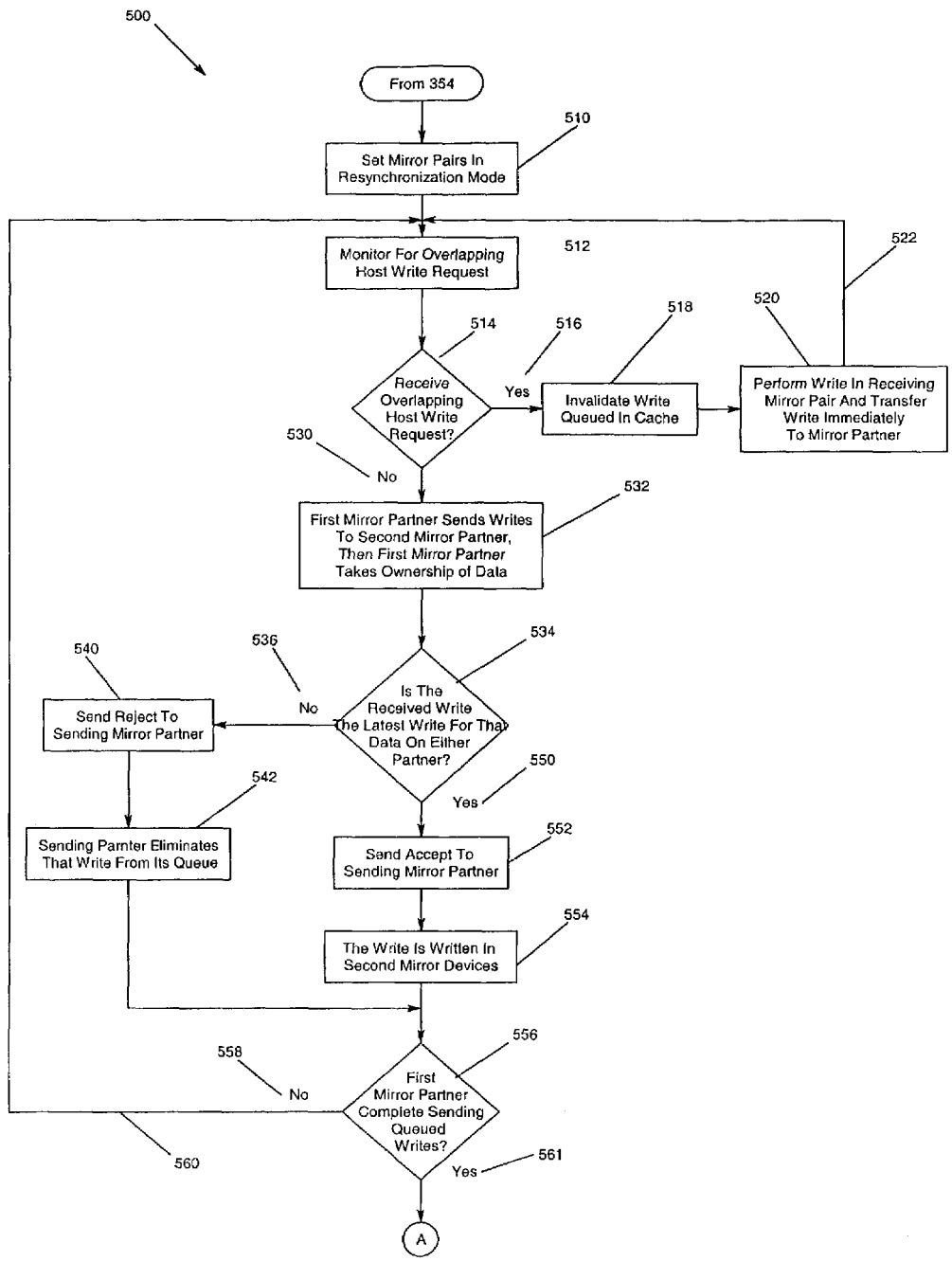
FIGS. 5a–b show a flow chart illustrating the data resynchronization process according to the present invention.
Figure 5B:
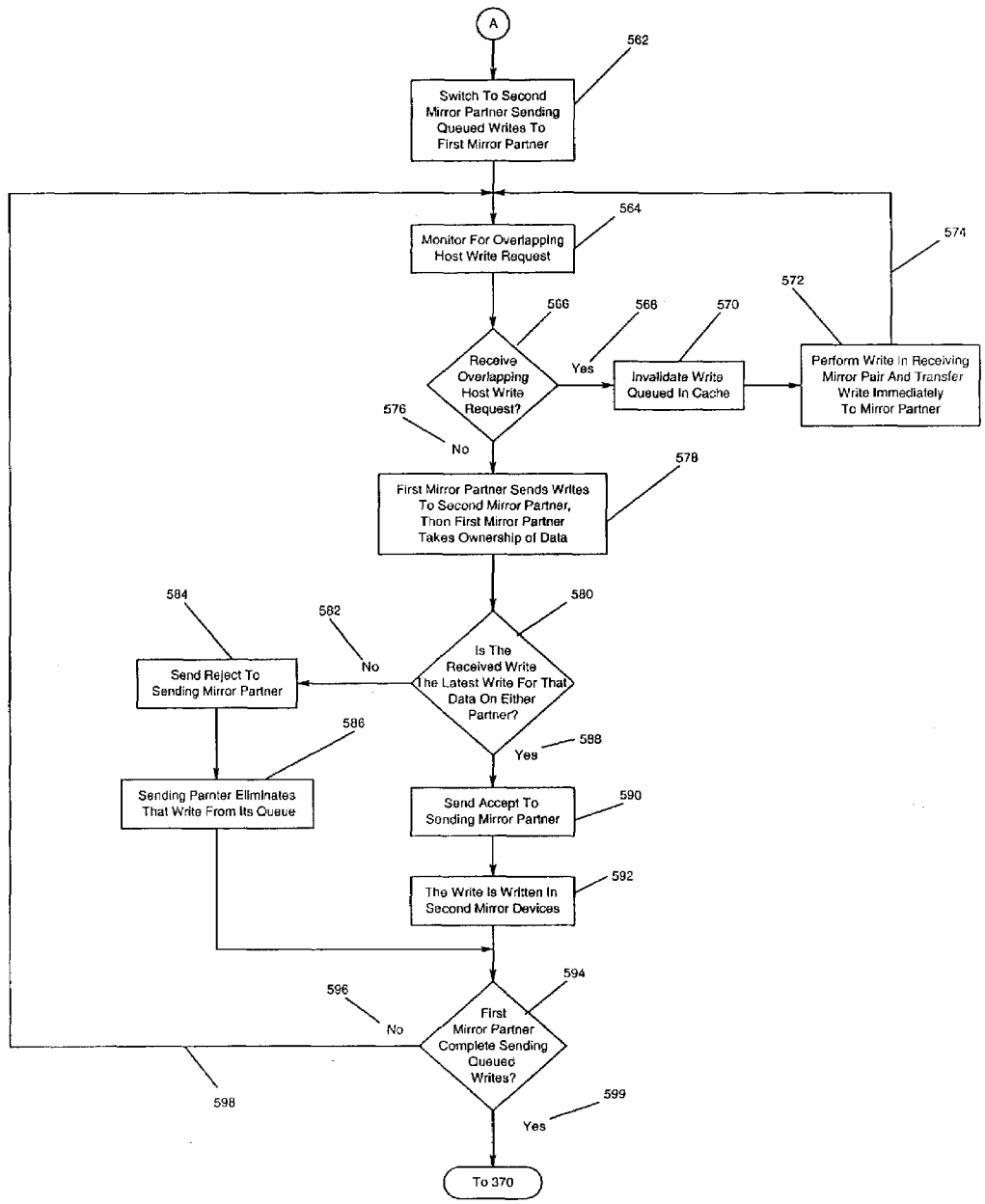

FIGS. 5a–b show a flow chart 500 illustrating the data resynchronization process according to the present invention. In FIG. 5a, the mirror pair is set in the resynchronization mode 510. During resynchronization, the system monitors for an overlapping host write request 512. A determination is made whether an overlapping host write request is received 514. When an overlapping host write request is received 516, the overlapped write queued in the cache is invalidated 518. The received overlapping write is performed at the receiving partner and the write is transferred immediately to the mirror partner 520. The process returns to monitor for other overlapping host write requests 522.

When an overlapping host write request is not received 530, the first mirror partner sends writes to the second mirror partner and the first mirror partner takes ownership of the data extent on its system 532. A data extent is a set of consecutively addressed member disk blocks that is part of a single virtual disk-to-member disk mapping. For example, the data extent is essentially a range of logical block addresses on a physical disk that when combined with other data extents makes up a volume set. A volume set is a collection of user data extents presented to an operating system as a range of consecutive logical block addresses. A volume set may have its data protected by different RAID levels.

The receiving mirror partner compares the timestamp for the received write with a corresponding record in its cache to determine whether the received write is the latest write for that data on either mirror pair 534. If not 536, a reject is sent to the sending mirror partner 540. The sending mirror partner then eliminates that write from its queue 542. Thereafter, the first mirror partner continues to send queued writes until all queued writes from the first mirror partner have been sent 550.

When the received write is the latest write for that data on either mirror pair, an accept is sent to the sending mirror partner 552. The write is then written in the receiving mirror partner 554. Thereafter, the first mirror partner continues to send queued writes. A determination is made whether the first mirror partner has completed sending writes queued in its cache 556. If not 558, the system returns to repeat the process 560.

FIG. 5b shows the process when the first mirror partner has completed sending its queued writes 561. In FIG. 5b, the system switches to the second mirror partner to send its queued writes to the first mirror partner 562. During resynchronization, the system monitors for an overlapping host write request 564. A determination is made whether an overlapping host write request is received 566. When an overlapping host write request is received 568, the overlapped write queued in the cache is invalidated 570. The received overlapping write is performed at the receiving partner and the write is transferred immediately to the mirror partner 572. The process returns to monitor for other overlapping host write requests 574.

When an overlapping host write request is not received 576, the second mirror partner sends writes to the first mirror partner and the second mirror partner takes ownership of the data extent on its system 578. The first mirror partner compares the timestamp for the received write with a corresponding record in its cache to determine whether the received write is the latest write for that data on either mirror pair 580. If not 582, a reject is sent to the second mirror partner 584. The second mirror partner then eliminates that write from its queue 586. Thereafter, the second mirror partner continues to send queued writes until all queued writes from the second mirror partner have been sent 598.

When the received write is the latest write for that data on either mirror pair 588, an accept is sent to the second mirror partner by the first mirror partner 590. The write is then written in the first mirror partner 592. A determination is made whether the second mirror partner has completed sending writes queued in its cache 594. If not 596, the system returns to repeat the process 598 to continue to send writes from the queue. When the second mirror partner has completed sending its queued write data, the first and second mirror partners are resynchronized, and the system again returns to normal input/output processing and monitors for a link failure 599.

In summary, during the resynchronize mode, each controller starts sending the write data to the mirror partner. The write data request is sent along with a timestamp so that the partner can correlate that write with any that it may have received. After all of the writes are sent over by one of the mirror partners, the same process begins again with the other mirror partner. While the resynchronize mode is in progress, the system will continue to accept host I/O and any host write I/O which overlaps queued writes, will invalidate the queued write and will be transferred immediately to the mirror partner. Because there is no single point of data storage, data is transferred to the mirror partner prior to allowing the partner access to the disk extent. This transfer of cached data also insures that the caches are coherent at the point a transfer of ownership of an extent takes place. Thus, there is no reason to invalidate data from a cache, prior to granting ownership of an extent.

FIG. 2 illustrates the data processing apparatus 200 according to the present invention, wherein the process illustrated with reference to FIGS. 3–4 and 5a–b may be tangibly embodied in a computer-readable medium or carrier, e.g. one or more of the fixed and/or removable data storage devices 268 illustrated in FIG. 2, or other data storage or data communications devices. A computer program 290 expressing the processes embodied on the removable data storage devices 268 may be loaded into the storage 204 or into the processor 202 to configure the data processing apparatus 200 of FIG. 2, for execution. The computer program 290 comprise instructions which, when read and executed by the data processing apparatus 200 of FIG. 2, causes the data processing apparatus 200 to perform the steps necessary to execute the steps or elements of the present invention The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer readable storage medium having computer executable instructions stored thereon to perform a method for maintaining data consistency and cache coherency during communications failures between nodes in a remote mirror pair, the method comprising:
   monitoring a link between a mirror pair of storage systems, the mirror pair comprising a first storage system and a second storage system;
   during a link failure between the first storage system and the second storage systems, independently performing reads and writes on the first and second storage systems and maintaining write data and associated timestamps for the write data for each write in a queue of the first and second storage system; and
   after link reestablishment, resynchronizing volume sets on the first and second storage systems using the write data and associated timestamps.

2. The computer readable storage medium of claim 1, wherein the resynchronizing further comprises:
   sending write data and an associated timestamp for a block of data of a volume set from the first storage system to the second storage system;
   comparing the timestamp for the write data for the block of data from the first storage system to a timestamp for a write for a mirrored block of data on the second storage system;
   determining whether the write data from the first storage system is the latest write; and
   sending an accept to the first storage system when the write data from the first storage system is the latest write and writing the write data for the block of data to the second storage system, else sending a rejection to the first storage system when the write data from the first storage system is not the latest write and eliminating the write data for the block of data on the first storage system.

3. The computer readable storage medium of claim 2 further comprising, after the first storage system has sent to the second storage system write data and an associated timestamps for all writes received by the first storage system:
   sending write data and an associated timestamp for a block of data of a volume set from the second storage system to the first storage system;
   comparing the timestamp for the write data for the block of data from the second storage system to a timestamp for a write for a mirrored block of data on the first storage system;
   determining whether the write data from the second storage system is the latest write; and
   sending from the first storage system an accept to the second storage system when the write data from the second storage system is the latest write and writing the write data for the block of data to the first storage system, else sending a rejection to the second storage system when the write data from the second storage system is not the latest write and eliminating the write data for the block of data on the second storage system.

4. The computer readable storage medium of claim 3 further comprising, after the second storage system has sent to the first storage system write data and associated timestamps for all writes received by the second storage system exiting the resynchronizing mode and returning to normal input/output processing.

5. The computer readable storage medium of claim 1 wherein the resynchronizing further comprises eliminating write data associated with a block of data on the first and second storage systems when a write received by the first storage system after reestablishment of the link overlaps write data on the first and second storage systems.

6. The computer readable storage medium of claim 1 wherein the maintaining write data and associated timestamps for the write data for each write on the first and second storage system further comprises when receiving multiple writes for a block of data on the first storage system maintaining only the last write for the block of data on the first storage system.

7. A data storage system, comprising:
   a first storage subsystem, the first storage subsystem comprising an array of drives;
   a second storage subsystem comprising an array of drives and having a mirrored volume set thereon of the volume set on the first storage subsystem;
   a first and second controller coupled respectively to the first and second storage subsystems; and
   a host, coupled to the first and second controllers, for issuing input/output requests to the first data storage system;
   wherein the first and second controller are coupled by a link, the first and second controller further being configured to monitor the link coupling the first storage system and the second storage system, during a link failure between the first storage system and the second storage systems, to independently perform reads and writes on the first and second storage systems and maintain write data and associated timestamps for the write data for each write in a queue of the first and second storage system and after link reestablishment, and to resynchronize volume sets on the first and second storage systems using the write data and associated timestamps.

8. The data storage system of claim 7, wherein the first controller resynchronizes volume sets by:
   sending write data and an associated timestamp for a block of data of a volume set from the first storage system to the second storage system;
   comparing the timestamp for the write data for the block of data from the first storage system to a timestamp for a write for a mirrored block of data on the second storage system;
   determining whether the write data from the first storage system is the latest write; and
   sending an accept to the first storage system when the write data from the first storage system is the latest write and writing the write data for the block of data to the second storage system, else sending a rejection to the first storage system when the write data from the first storage system is not the latest write and eliminating the write data for the block of data on the first storage system.

9. The data storage system of claim 8 wherein the second controller, after the first storage system has sent to the second storage system write data and an associated timestamps for all writes received by the first storage system:
   sends write data and an associated timestamp for a block of data of a volume set from the second storage system to the first storage system;
   compares the timestamp for the write data for the block of data from the second storage system to a timestamp for a write for a mirrored block of data on the first storage system;
   determines whether the write data from the second storage system is the latest write; and
   sends from the first storage system an accept to the second storage system when the write data from the second storage system is the latest write and writes the write data for the block of data to the first storage system, else sends a rejection to the second storage system when the write data from the second storage system is not the latest write and eliminates the write data for the block of data on the second storage system.

10. The data storage system of claim 9 wherein the first and second controller, after the second controller has sent to the first storage system write data and associated timestamps for all writes received by the second storage system, exits the resynchronizing mode and returns to normal input/output processing.

11. The data storage system of claim 7 wherein the first and second controller resynchronize the volume sets by eliminating write data associated with a block of data when a write received by the first storage system after reestablishment of the link overlaps write data on the first storage system.

12. The data storage system of claim 7 wherein the first controller upon receiving multiple writes for a block of data maintains only the last write for the block of data.

13. A data processing apparatus, comprising:
   a memory comprising executable instructions; and
   a processor for executing instructions provided from the memory;
   wherein the processor is configured to perform the executable instructions from the memory to monitor a link to a second storage system, during a failure of the link, to independently perform reads and writes and maintain write data and timestamps associated with the write data for each write in the memory and, after link reestablishment, to resynchronize volume sets with the second storage system using the write data and associated timestamps.

14. The data processing apparatus of claim 13, wherein the processor resynchronizes volume sets by:
   sending write data and an associated timestamp for a block of data of a volume set to the second storage system; and
   receiving an accept from the second storage system when the sent write data is the latest write, else receiving a rejection from the second storage system when the sent write data is not the latest write and eliminating the write data for the block of data in the memory.

15. The data processing apparatus of claim 14 wherein the processor, after sending the second storage system write data and an associated timestamps for all writes received in the queue:
   receives write data and an associated timestamp for a block of data of a volume set from the second storage system;
   compares the timestamp for the write data for the block of data from the second storage system to a timestamp for a write for a mirrored block of data in the memory;
   determines whether the write data from the second storage system is the latest write; and
   sends an accept to the second storage system when the write data from the second storage system is the latest write and writes the write data for the block of data, else sends a rejection to the second storage system when the write data from the second storage system is not the latest write.

16. The data processing apparatus of claim 15 wherein the processor, after the second storage system has sent write data and associated timestamps for all writes received by the second storage system, exits the resynchronizing mode and returns to normal input/output processing.

17. The data processing apparatus of claim 13 wherein the processor further resynchronizes volume sets by eliminating write data associated with a block of data in the memory when a write received after reestablishment of the link overlaps write data in the memory.

18. The data processing apparatus of claim 13 wherein the processor maintains comprises upon receiving multiple writes for a block of data maintains only the last write for the block of data in the memory.

19. A method for maintaining data consistency and cache coherency during communications failures between nodes in a remote mirror pair, the method comprising:
   monitoring a link between a mirror pair of storage systems, the mirror pair comprising a first storage system and a second storage system;
   during a link failure between the first storage system and the second storage systems, independently performing reads and writes on the first and second storage systems and maintaining write data and associated timestamps for the write data for each write in a queue of the first and second storage system; and
   after link reestablishment, resynchronizing volume sets on the first and second storage systems using the write data and associated timestamps.

20. A data storage system, comprising:
   a first storage means for storing a volume set thereon;
   a second storage means for providing a mirrored volume set thereon of the volume set on the first storage subsystem;
   means, coupled to the first and second storage means, for controlling the first and second storage means; and
   host means, coupled to the means for controlling, for issuing input/output requests to the first data storage system;
   wherein the means for controlling include linking means, the means for controlling further monitoring the linking means and, during a link failure between the first storage means and the second storage means, independently performing reads and writes on the first and second storage means and maintaining write data and associated timestamps for the write data for each write in a queue of the first and second storage means and after link reestablishment, and resynchronizing volume sets on the first and second storage means using the write data and associated timestamps.

21. A data processing apparatus, comprising:
   means for providing memory that includes executable instructions; and
   processing means for executing instructions provided from the means for providing memory;
   wherein the processing means is configured to perform the executable instructions from the means for providing memory for monitoring a link to a second storage means, during a failure of the link, independently performing reads and writes and maintaining write data and timestamps associated with the write data for each write in the means for providing memory and, after link reestablishment, resynchronizing volume sets with the second storage means using the write data and associated timestamps.

* * * * *